(12) United States Patent
Tabet et al.

(10) Patent No.: US 9,277,582 B2
(45) Date of Patent: Mar. 1, 2016

(54) FAST COMMUNICATION RECOVERY IN DUAL NETWORK RADIO RESOURCE MANAGEMENT

(71) Applicant: Apple Inc., Cupertino, CA (US)

(72) Inventors: Tarik Tabet, Los Gatos, CA (US); Syed A. Mujtaba, Santa Clara, CA (US); Kee-bong Song, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 13/622,594

(22) Filed: Sep. 19, 2012

(65) Prior Publication Data

US 2013/0310057 A1    Nov. 21, 2013

Related U.S. Application Data

(60) Provisional application No. 61/648,395, filed on May 17, 2012.

(51) Int. Cl.
*H04W 72/00* (2009.01)
*H04W 76/04* (2009.01)
*H04W 76/02* (2009.01)
*H04W 88/06* (2009.01)

(52) U.S. Cl.
CPC .......... *H04W 76/045* (2013.01); *H04W 76/028* (2013.01); *H04W 76/026* (2013.01); *H04W 76/046* (2013.01); *H04W 88/06* (2013.01)

(58) Field of Classification Search
CPC ............ H04W 76/026; H04W 76/028; H04W 76/045; H04W 76/046; H04W 88/06

USPC ......................................................... 455/450
See application file for complete search history.

(56) References Cited

U.S. PATENT DOCUMENTS

| | | | |
|---|---|---|---|
| 7,860,063 B2 | 12/2010 | Low et al. | |
| 8,064,405 B2 | 11/2011 | Parekh et al. | |
| 2002/0111169 A1* | 8/2002 | Vanghi | 455/436 |
| 2003/0144000 A1 | 7/2003 | Glazko et al. | |
| 2006/0176870 A1 | 8/2006 | Joshi | |
| 2007/0053327 A1* | 3/2007 | Park | 370/335 |
| 2010/0159954 A1 | 6/2010 | Rahman et al. | |

(Continued)

OTHER PUBLICATIONS

International Search Report and Written Opinion from PCT/US2013/039383, dated Oct. 9, 2013, Apple Inc., pp. 1-12.

(Continued)

*Primary Examiner* — Timothy Pham
(74) *Attorney, Agent, or Firm* — Meyertons Hood Kivlin Kowert & Goetzel, P.C.; Jeffrey C. Hood; Erik A. Heter (57) ABSTRACT

Various embodiments are disclosed of a method and apparatus for fast communication recovery in wireless mobile devices arranged to perform dual network radio resource management. In one embodiment, a wireless mobile device includes a transceiver configured to communicate with each of first and second networks. After establishing and maintaining a link with the first network, the wireless mobile device may tune a transceiver to the second network to monitor for traffic, subsequently tuning back to the first network. After turning the transceiver back to the first network, the wireless mobile device may perform one or more attempts to restore the link to the first network. The number of attempts to restore the link is dependent upon an amount of time the transceiver is tuned to the second network.

21 Claims, 8 Drawing Sheets

(56) References Cited

U.S. PATENT DOCUMENTS

| | | |
|---|---|---|
| 2010/0267342 A1 | 10/2010 | Julka |
| 2010/0297995 A1 | 11/2010 | Macias et al. |
| 2010/0323696 A1 | 12/2010 | Cherian et al. |
| 2011/0044300 A1* | 2/2011 | Joshi et al. .................... 370/336 |
| 2012/0282975 A1 | 11/2012 | Mujtaba |
| 2013/0023275 A1* | 1/2013 | Mutya et al. ............... 455/452.1 |
| 2013/0172023 A1* | 7/2013 | Chan et al. .................... 455/466 |

OTHER PUBLICATIONS

International Preliminary Report on Patentability from PCT/US2013/039383, issued Nov. 27, 2014, Apple Inc., pp. 1-9.

Office Action from Taiwanese Application No. 102117075, mailed Oct. 27, 2014, English and Chinese versions, pp. 1-23.

Office Action, German Application No. 112013002517.5, mailed Oct. 28, 2016, 15 pages.

* cited by examiner

FAST COMMUNICATION RECOVERY IN DUAL NETWORK RADIO RESOURCE MANAGEMENT

PRIORITY INFORMATION

This application claims priority to U.S. provisional patent application Ser. No. 61/648,395, entitled "Fast Communication Recovery in Dual Network Radio Resource Management", filed May 17, 2012, and which is hereby incorporated by reference in its entirety as though fully and completely set forth herein.

BACKGROUND

1. Technical Field

This disclosure is directed to wireless telecommunications systems, and more particularly, to user devices capable of communicating with multiple networks.

2. Description of the Related Art

In recent years, wireless devices such as smart phones and tablet computers have become increasingly sophisticated. In addition to supporting telephone calls, many mobile devices now provide access to the internet, email, text messaging, and navigation using the global positioning system (GPS). Furthermore, many mobile devices are capable of operating sophisticated applications, many of which may utilize the functionality mentioned above.

In large part due to their increased functionality, many wireless devices are capable of communicating with multiple networks using a single transceiver. For example, a transceiver of a wireless device may have a communications channel established with a first network (e.g., LTE, or Long Term Evolution, sometimes referred to as 4G), but may from time to time tune away to monitor for communications on a second network (e.g., a CDMA, or code division multiple access network). During the time the transceiver is tuned to the second network, it is unable to receive communications from the first network. When tuned to the second network, the transceiver may lose synchronization with the first network due to missing receiving important signaling messages. This loss of synchronization can prolong the amount of time in which communication and data transfer between the wireless device and the first network, as the re-establishment of synchronization upon tuning back to the first network may consume time. In some cases, the first network may drop the link with the wireless device altogether without the latter being informed.

SUMMARY

Various embodiments are disclosed of a method and apparatus for fast communication recovery in wireless mobile devices arranged to perform dual network radio resource management. In one embodiment, a wireless mobile device includes a transceiver configured to communicate with each of first and second networks. After establishing and maintaining a link with the first network, the wireless mobile device may tune a transceiver to the second network to monitor for traffic, subsequently tuning back to the first network. After turning the transceiver back to the first network, the wireless mobile device may cause the transceiver to perform one or more attempts to restore the link to the first network. The number of attempts to restore the link is dependent upon an amount of time the transceiver is tuned to the second network. If the attempts to restore the link are unsuccessful, a new link with the first network may be requested by the wireless mobile device.

In one embodiment, various procedures may be performed in attempting to restore the link to the first network. The various procedures may include first, second, and third procedures. Responsive to re-tuning to the first network, the wireless network, one ore more attempts to restore the link may be performed using a first procedure. If each of the one or more attempts of the first procedure fail to restore the link, one or more attempts to restore the link using a second procedure may be performed. If each of the one or more attempts of the second procedure fail to restore the link, one or more attempts to restore the link using a third procedure may be performed. If each of the one or more attempts of the third procedure fail to restore the link, the wireless mobile device, then the wireless mobile device may request a new link with the first network. The number of attempts that each of the procedures is performed before moving onto the next procedure may be determined based on an amount of time that the transceiver was tuned to the second network prior to re-tuning to the first network. If an attempt to restore the link is successful, no subsequent attempts of the current procedure or any additional procedures are performed, and communication over the link between the wireless mobile device and the first network may resume as they were prior to tuning to the second network.

The likelihood that the link between the first network and the wireless mobile device is dropped may increase with the amount of time of the interval that the wireless mobile device is tuned to the second network. Thus, the number of attempts of a given procedure may be adjusted according to the amount of time. For example, a first procedure may include transmitting scheduling requests from the wireless mobile device to the first network. If the time of the interval tuned to the second network is less than a first threshold, then the maximum number of scheduling requests transmitted in attempting to restore the link may be a first number. If the time of the interval is greater than the first threshold but less than a second threshold, the number of scheduling requests transmitted in attempting to restore the link may be a second number that is less than the first number. If the time interval is greater than the second threshold, the number of Scheduling Requests transmitted in attempting to restore the link may be a third number that is less than the second number.

In general, the maximum number of times that a given procedure may be performed in attempting to restore the link may be reduced as the amount of time tuned to the second network increases. Furthermore, the number and types of procedures performed in attempts to restore the link may vary from one embodiment to another.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word may is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Acronyms

The following acronyms are used in the present Provisional patent application:
 CDMA: Code Division Multiple Access
 DL: Downlink
 LTE: Long Term Evolution (4G)
 RACH: Random Access Channel
 RLC: Radio Link Control
 RLF: Radio Link Failure
 RRC: Radio Resource Control
 SR: Scheduling Request
 Tx: Transmission
 UE: User Equipment
 UL: Uplink
 UMTS: Universal Mobile Telecommunication System

TERMS

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication. A UE/UE device may include a radio, which may be a transceiver used to transmit signals to and receive signals from other equipments, such as other transceivers in a base transceiver station.

Tune/Tune-Away/Re-tune—throughout this specification, reference is made to a UE/UE device tuning to a network, tuning away from a network, and re-tuning to a network. Tuning a UE/UE device to a network (or tuning the radio of a UE/UE device to a network) as defined herein may refer to configuring the radio/transceiver of the UE/UE device to communicate with a particular (first) radio access network (RAN) using a particular radio access technology (RAT) through a base transceiver station (BTS; also referred to as a 'base station') that supports communications with the first network. Tuning away from the first network (or tuning away to a second network) as defined herein may refer to configuring the radio/transceiver of a UE/UE device to communicate with another RAN using another RAT (wherein the RAT/RAN may be supported by the same base station, or by a different base station) after having previously established a link with a first RAN. Re-tuning (or re-tuning to the first network) as defined herein may refer re-configuring the radio/transceiver of a UE/UE device to resume communications (or attempt to resume communications) with the first RAN using the RAT and with the base station through which a link was established prior to tuning away.

Figure 1:
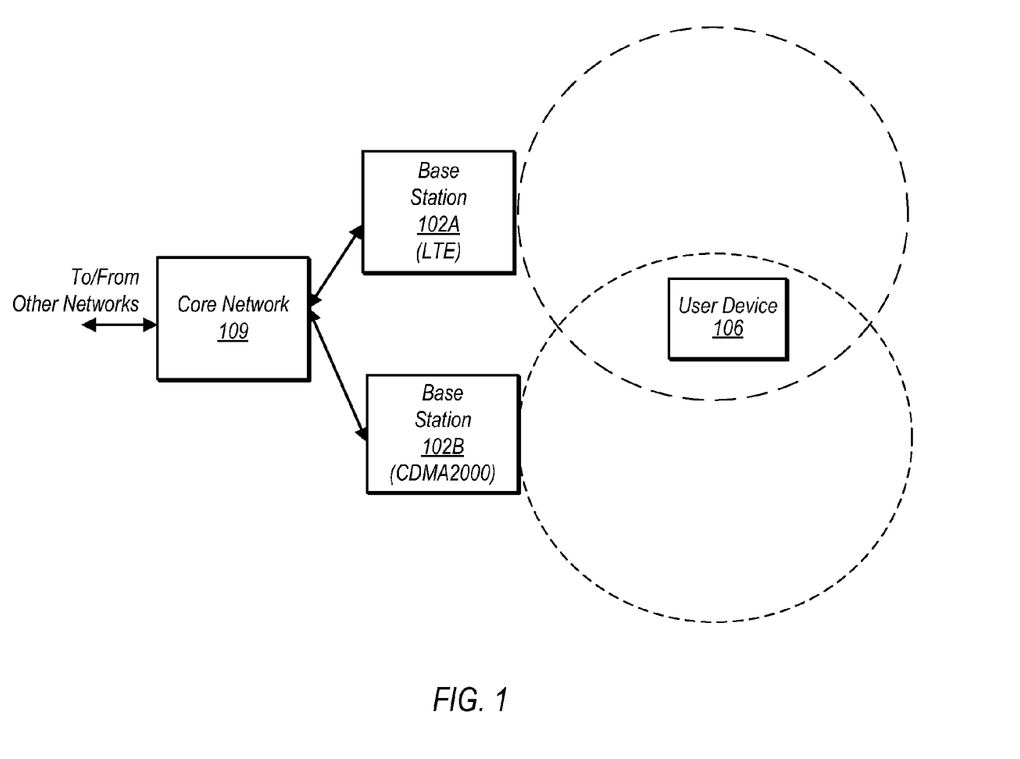
FIG. 1 illustrates an exemplary (and simplified) wireless communication system.

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a first base station 102A and a second base station 102B, each of which may communicate over a transmission medium with UE 106.

The base stations 102A and 102B may be base transceiver stations (BTS) or cell site, and may include hardware that enables wireless communication with the UE 106. The base stations 102A, 102B are connected to a core network 109, which is in turn connected to other external networks, such as the Internet, Public Switched Telephone Networks (PSTNs), and/or other networks. The respective communication areas (or coverage areas) of the base stations 102A, 102B may be referred to as a "cell." UE 106 in this example is geographically located in an area in which the respective cells of base stations 102A, 102B are overlapping, and thus UE 106 may establish communication links with both base statrions 102A, 102B. In the exemplary system of FIG. 1, base station 102A 102A communicates with the UE 106 using LTE technology, while base station 102B of communicates with the UE using 3GPP2 CDMA2000 (1xRTT/1xEV-DO/HRPD/eHRPD) technology.

UE 106 may establish a communcations link with base station 102A. After some time communicating with base station 102A, UE 106 may temporarily tune its transceiver away from base station 102A (and thus away from the LTE network) to base station 102B (e.g., to monitor for certain types of traffic on the CDMA2000 network). UE 106 may then tune its radio back to base station 102A and attempt to restore the link to the LTE network. In some embodiment, depending on the amount of time that the particular UE 106 is tuned away from base station 102A, different methods may be utilized to restore the communications link. These various methods are discussed in further detail below.

Although FIG. 1 shows an exemplary system that includes the use of LTE and CDMA2000 technology, the features described herein may be used in the context of any appropriate combination of RATs, including but not limited to technologies such as 3G, GSM, WCDMA, CDMA2000, LTE, LTE-Advanced (LTE-A), WLL, WAN, WiFi, WiMAX, and/or any other appropriate technology. It should also be understood that many variations on the exemplary system of FIG. 1 are possible, and that the features described herein may be used in any appropriate communication system. As one variation on the system of FIG. 1, for example, the features described herein may be used in a system that includes multi-mode base stations that each implement multiple RATs. As shown in FIG. 1, the UE 106 communicates with two different base stations 102A, 102B, using respective different RATs for each of the base stations 102A, 102B; however, in an instance where a multi-mode base station is used, a UE may communicate with the same base station, and tune away to/from the multiple wireless networks of different RATs provided by that same base station. Alternatively or additionally, the features described herein may be used with a network architecture that includes multiple core networks, where base stations that implement a first RAT (e.g., LTE) are connected to a first core network, while base stations that implement a second RAT (e.g., CDMA2000) are connected to a second core network.

The UE 106 may be a device with wireless network connectivity such as a mobile phone, a hand-held device, a computer or a tablet, or virtually any type of wireless device. The UE 106 may include at least one processor that is configured to execute program instructions stored in memory. The UE 106 may perform any of the embodiments described herein by executing such stored instructions. In some embodiments, the UE 106 may include a programmable hardware element such as an FPGA (field-programmable gate array) that is configured to perform any of the method embodiments described herein, or any portion of any of the method embodiments described herein.

Figure 2:
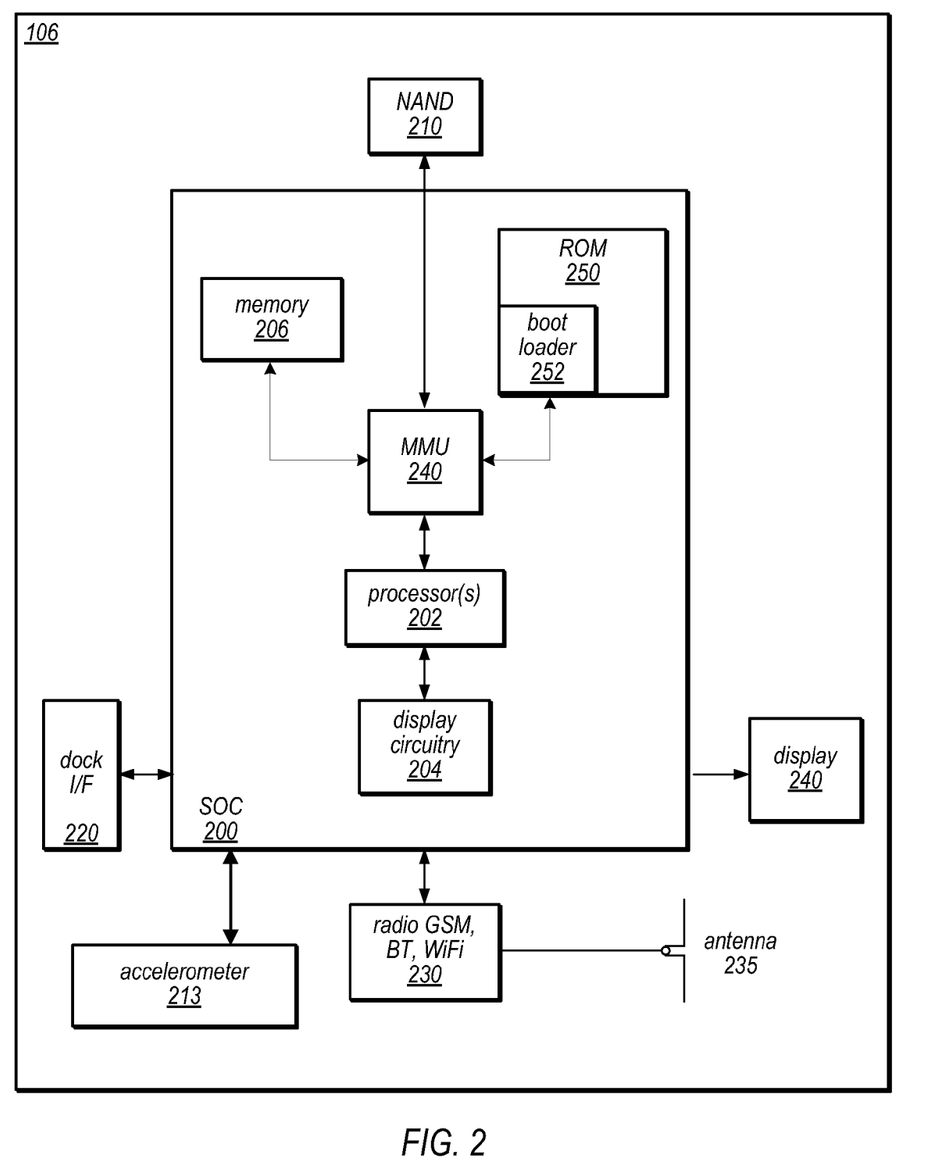
FIG. 2 illustrates an exemplary block diagram of a UE 106, according to one embodiment.

FIG. 2 illustrates an exemplary block diagram of a UE 106. As shown, the UE 106 may include a system on chip (SOC) 200, which may include different functional units for various purposes. For example, as shown, the SOC 200 may include processor(s) 202 (or processor core(s) 202) which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, transceiver 230, connector I/F 220, and/or display 240. The MMU 240 may be configured to perform memory protection and page table translation or set up. In some embodiments, the MMU 240 may be included as a portion of the processor(s) 202. Overall, SOC 200 may function as a control circuit for controlling the operation of UE 106.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for GSM, Bluetooth, WiFi, etc.) which may use antenna 235 to perform the wireless communication.

UE 106 in the embodiment shown also includes an accelerometer 213 coupled to SOC 200. Accelerometer 213 may be used to detect the motion of UE 106. In one embodiment, accelerometer 213 may provide indications of velocity (speed and direction of movement) of UE 106. Accelerometer 213 may also generate indications of orientation of UE 106 in some embodiments. Such indications may be used by processor(s) 202 and display circuitry 204 to determine how information may be displayed on display 204.

UE 106 in the embodiment shown may be configured for operation with multiple networks, and more particularly, with multiple network protocols. Network protocols for which UE 106 is capable of operation may include (but are not limited to), 2G, 3G, LTE (4G), WCDMA, CDMA2000, GSM, Wi-Fi, Bluetooth, and so on. During normal operation, UE 106 may establish a network connection with one of the networks for which it is capable of operation. From time to time, SOC 200 may cause transceiver 230 to tune away from the first network, e.g, an LTE network, to a second network, e.g., a CDMA2000 (or "1x") network. When transceiver 230 is tuned to the CDMA2000 network, UE 106 may monitor for traffic therefrom. The UE 106 may also monitor the CDMA2000 network for paging channels, etc. to determine if there is any incoming traffic to be received. Subsequently, UE 106 may tune back to the LTE network. Depending on the length of time tuned away from the LTE network, UE 106 may in some cases miss various types of signaling that are transmittedtherefrom. This may cause UE 106 to lose synchronization with the LTE network, and thus the link to the LTE network may be restored upon re-tuning. For longer periods that transceiver 230 is tuned away from the first network, the likelihood that the first network releases the RRC connection of UE 106 is increased.

The base station supporting the connection to the first network may release the RRC connection of UE 106 for various reasons. For example, an RRC inactivity timer at the first network may expire, a maximum number of RLC transmissions may be reached, or the first network may detect a an RLF. When UE re-tunes to the base station supporting to first network, it may be under assumption that the RRC connection has not been released, as it may have missed an RRC release message from the first network. If the UE 106 has data to transmit, it may (in one embodiment) send one or more SR messages to the first network over a previously established access channel. Should the SR (scheduling request) messages fail to fully restore the link, the UE in this embodiment may transmit one or more SR's over a RACH. If the SR's transmitted over the RACH fails to re-establish the link, the UE 106 in this embodiment may start an RRC re-establishment procedure with the first network. If the first network rejects the re-establishment (e.g., the RRC was released), then, as a last resort, the discussed embodiment of the UE 106 may start an RRC connection request, which is a request for a new link to be established. In the various embodiments discussed below, the number of times these various procedures are performed may be limited by the amount of time that UE 106 was tuned away from the first network. In one embodiment, the maximum number of times one or more of the various procedures are attempted may be inversely proportional to the amount of time tuned away from the first network.

Figure 3:
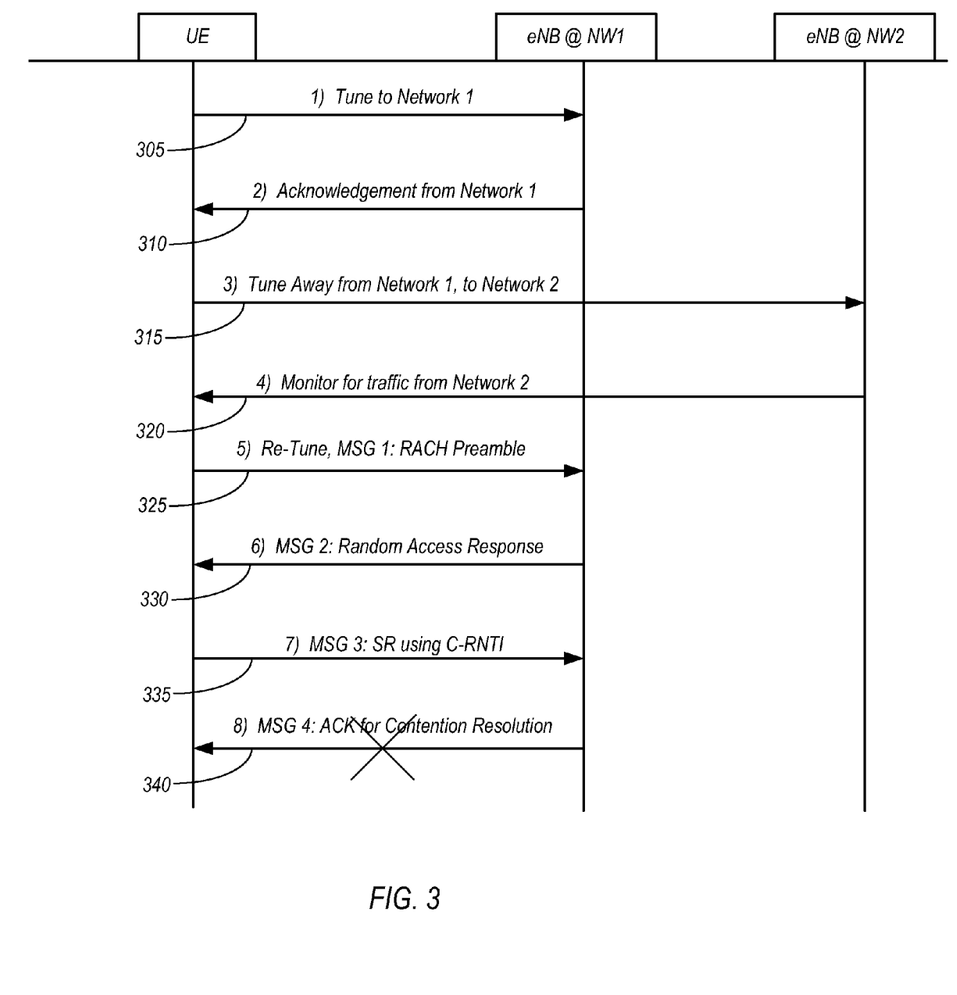
FIG. 3 is diagram illustrating one type of procedure to restore a link between a wireless mobile device and a first network subsequent to re-tuning to the first network.

Turning momentarily to FIG. 3, a diagram illustrating one type of procedure to restore a link between a wireless mobile device and a first network subsequent to re-tuning to the base station of the first network is shown. In the example shown, a transceiver of UE 106 is tuned to a Network 1 (305) through a base station and receives an acknowledgement therefrom after the link has been established (310). At some time subsequent to establishing the link, the transceiver of UE 106 may momentarily tune away from Network 1 and to base station providing service for Network 2 (315) to monitor for incoming traffic (320). The incoming traffic may be in the form of incoming telephone calls, text messages, or any other type of traffic supported by Network 2. Thereafter, the transceiver of UE 106 may re-tune to Network 1. Upon re-tuning to Network 1, a preamble may be sent from the transceiver of UE 106 to the base station over a RACH (325). The base station of the Network 1 may return a random access response to acknowledge receipt of the preamble (330). The transceiver of UE 106 may then respond by sending an SR message to the base station of the Network 1 (335). If the RRC connection has not been released by the base station of Network 1, than an acknowledgment may be sent to UE 106 (340). Thereafter, the transceiver of UE 106 may transmit UL communications to Network 1, via the base station, and may receive DL communications therefrom. If, on the other hand, the RRC connection has been released, no acknowledgement message is sent therefrom to be received by UE 106. Multiple attempts of SR over the RACH to restore the link may thus fail.

In order to determine an amount of time that UE 106 is tuned way from the base station, a timer may be implemented. In one embodiment, the timer may be implemented as hardware on SOC 200 or elsewhere in UE 106. In another embodiment, the timer may be implemented using software instructions executed in one or more of the processors 202 of UE 106. A control circuit (e.g., one or more of processors 202 and/or instructions executed thereon) may calculate a maximum number of attempts to be performed for each of the various procedures to be performed in attempting to restore the link between UE 106 and the first network. Various time thresholds may be implemented as well to determine which of the methods is to be followed attempting to restore the link with the first network. For the purposes of simplicity, this disclosure discusses two different thresholds and three corresponding time periods: a short tune-away period, a medium tune-away period, and a long tune-away period. It is noted however that this disclosure is not meant to be limiting, and thus any suitable number of tuning periods may be implemented, which higher granularity than disclosed here being possible and contemplated. Furthermore, while certain procedures for restoring a communications link are discussed herein, the scope of the disclosure is not intended to be limited to these particular procedures. In general, any procedures suitable for restoring a communications link between a UE and a first network following a tune-away to a second network are possible and contemplated. Moreover, such procedures may be compatible with the various networks for which communications with the UE are possible. Thus, it is possible and contemplated that different procedures are used with different types of networks. The procedures may be performed under the direction of a control circuit (e.g., processor 202), and may include the transceiver of UE 106 performing various transmissions under the direction of the control circuit.

Figure 4:
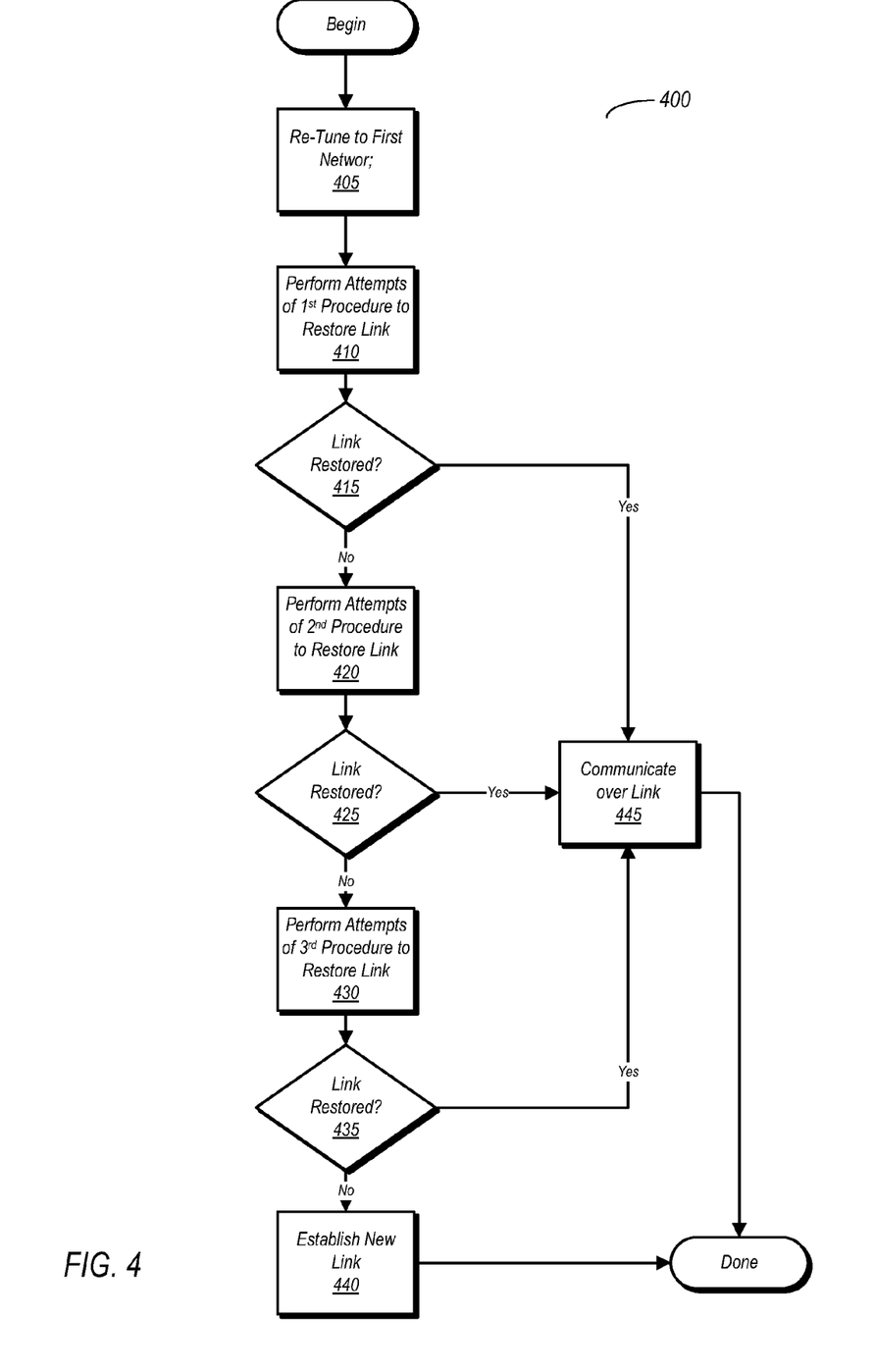
FIG. 4 is a flow diagram illustrating one embodiment of a method for attempting to restore a link from a wireless mobile device to a first network.

Turning now to FIG. 4, a flow diagram illustrating one embodiment of a method for attempting to restore a link from a wireless mobile device to a first network is shown. In the embodiment shown, method 400 begins with a re-tuning of a UE transceiver to a first network (block 405) after a period of time tuned away to a second network. Method 300 assumes that the UE transceiver was tuned to the first network prior to tuning it to the second network and subsequently re-tuning to the first network. In one embodiment, the amount of time that the UE transceiver was tuned away may be computed and used as a basis for determining the type of procedures and maximum number of attempts of each that are to be performed in attempting to restore the link between the UE and the first network. In another embodiment, the maximum number of attempts for a given procedure may be a fixed value, as set by the control circuit/SOC of the UE, irrespective of the amount of time tuned away from the first network. It is noted that in embodiments in which a fixed number of attempts are performed for a given procedure, irrespective of the amount of time tuned away, the control circuit of the UE may override a base station in determining the fixed number. For example, the base station may permit up to ten attempts of a given procedure, whereas the control circuit may limit itself to performing only five attempts of the same procedure. In general, the control circuit may override a limit to the number of attempts of a specific procedure by the base station with a self-imposed limit less than that set by the base station. The number of attempts for a given procedure may be stored within the control circuit, e.g., in a register, a non-volatile memory therein, or any other suitable storage medium.

After re-tuning to the first network, one or more attempts to restore a link with the first network may be performed using a first procedure (block 410). If one of the attempts is successful (block 415, yes), then the UE and the first network may begin communications over the restored link (block 445). If none of the attempts to restore the link using the first procedure are successful (block 415, no), then one or more attempts to restore the link using a second procedure may be performed (block 420). If any of the attempts to restore the link using the second procedure are successful (block 425, yes), then communications between the UE and the first network may resume over the link (block 445). If none of the attempts using the second procedure are successful (block 425, no), then one or more attempts to restore the link are performed using a third procedure (block 430). If any attempt to restore the link using the third procedure is successful (block 435, yes), then communications between the UE and the first network may resume over the link (block 445). Otherwise, if none of the attempts to restore the link using the third procedure is successful (block 435, no), it may be determined that the first network has released the RRC connection for the UE. Accordingly, the UE may send a request to the first network to establish a new link (block 440).

In one embodiment, the number of attempts for various ones of the procedures may be based on the amount of time tuned away from the first network. For example, if the time tuned away from the first network is short (e.g., less than a first threshold), then X SR messages may be sent from the transceiver of UE 106 in attempting to restore the link. If the time tuned away from the first network is of a medium length (e.g., above a first threshold but below a second threshold), then Y SR messages may be transmitted from the transceiver of UE 106, where Y<X. Thus, the number of attempts using a particular procedure may in some cases be decreased for longer tune-away times relative to the number of attempts for shorter tune-away times.

It is further noted that in some embodiments, transmission power may be increased with successive attempts. The amount of power ramp-up from one attempt to the next may be based on a maximum number of attempts. In one embodiment, a power ramp-up step may be greater when the maximum number of attempts is smaller (based on a long tune-away time) vs. that when the maximum number of attempts is large (based on a short tune-away time). For example, when performing multiple attempts of a first procedure (block 410), transmission power from the transceiver of the UE may be increased with each successive attempt. A transmission power may be set at a value designated P0 for a first attempt. If the first attempt is unsuccessful in restoring the link, a second attempt may be performed with a power level of P0+ΔP, wherein ΔP is an increment of added transmission power. If the second attempt is not successful, a third attempt may be performed at a transmission power of P0+2ΔP. Attempts may continue to be performed up to the maximum number, with each successive attempt adding another increment of transmission power. In general, the transmission power for $n^{th}$ attempt of a given procedure may be expressed as Power=P0+(n−1)ΔP. It is further noted that the incremental increase of transmission power may be performed with any of the procedures for which multiple attempts are performed (e.g., in blocks 420 and 430, in addition to block 410).

Figure 5:
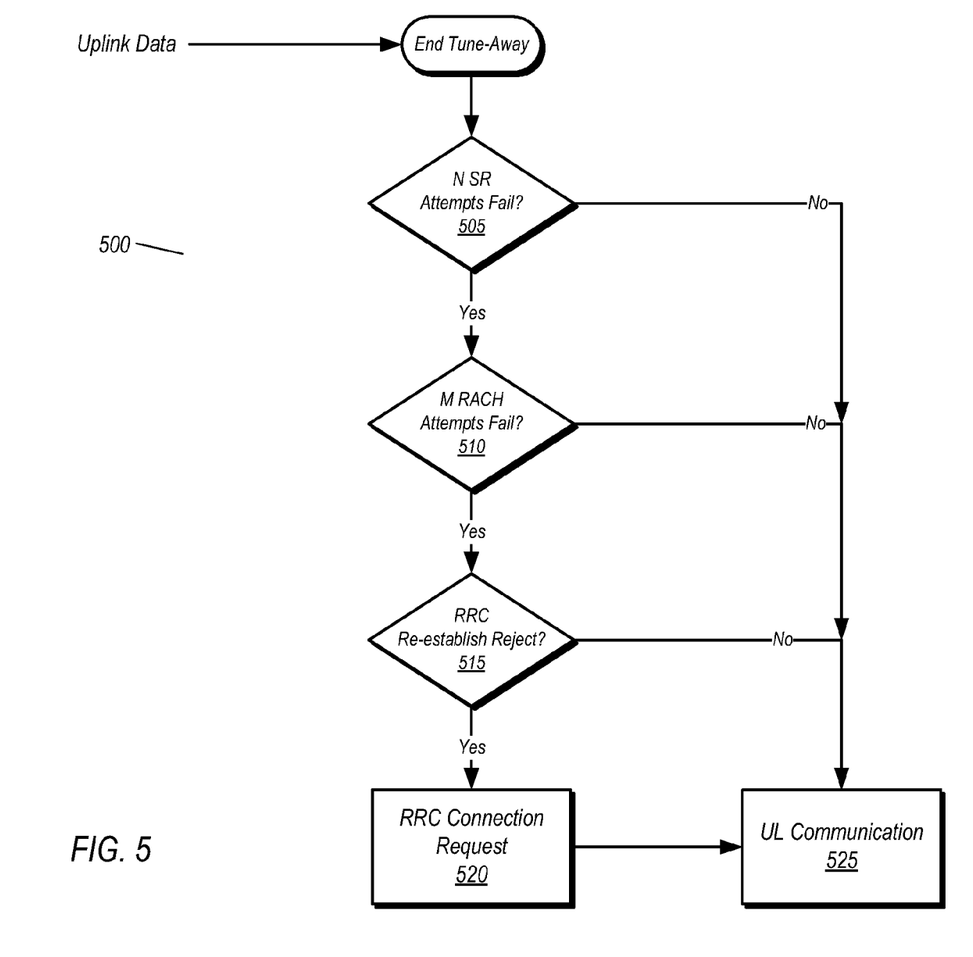
FIG. 5 is a flow diagram illustrating one embodiment of a method for attempting to restore link from a wireless mobile device to a first network after a short duration tune away.

FIG. 5 is a flow diagram illustrating a method for attempting to restore a link from a UE to a first network after a short duration tune away. This method may be performed when the timer indicates that the amount of time the transceiver of the UE was tuned away is less than a first time threshold. The methodology shown here stipulates that a determination that the tune-away has been determined as a short duration tune-away.

In the embodiment shown, method 500 begins with a re-tuning of the UE to the first network. Upon re-tuning to the first network, up to N attempts to restore the link using SR messages may be made. The SR messages may be transmitted over a previously established channel between the UE and the first network. If each of the N attempts fails (block 505, yes), then M attempts to restore the link may be performed by transmitting SR messages over a RACH. If each of the M attempts to restore the link by transmitting the SR messages over a RACH are unsuccessful in restoring the link (block 510, yes), then the UE may transmit a RRC Re-establishment request to the first network. If the request to re-establish the link is rejected by the first network (block 515, yes), then the UE may transmit a RRC connection request (block 520) to establish a new link with the first network. Following establishment of the new link, the UE may transmit information on the UL to the first network (block 525).

If any of the N SR attempts is successful in restoring the link (block 505, no), then the link is restored and the UE may transmit information on the UL to the first network (block 525). Similarly, if any one of the M RACH attempts is successful (block 510, yes), the link is restored and communications may resume with the UE transmitting information on the UL. Moreover, if the RRC re-establishment request is not rejected (block 515, no), the link is restored.

Figure 6:
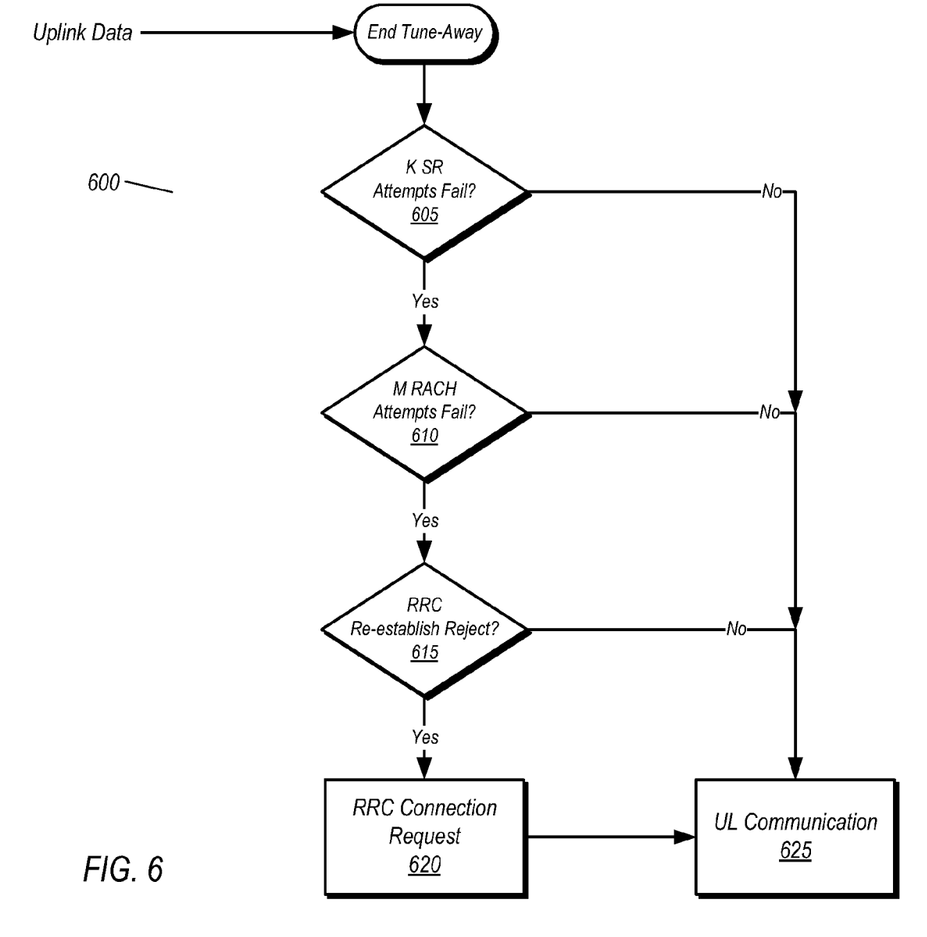
FIG. 6 is a flow diagram illustrating one embodiment of a method for attempting to restore link from a wireless mobile device to a first network after a medium duration tune away.

FIG. 6 is a flow diagram illustrating a method for attempting to restore link from a UE to a first network after a medium duration tune away. Method 600 may be performed when the timer indicates that the amount of time tuned away from the first network is greater than the first time threshold but less than a second time threshold. The flow of method 600 in the embodiment shown is substantially the same as that of method 500 discussed above. However, instead of limiting the number of SR attempts to N, the number of attempts is limited to K, wherein K<N. Since it is more likely that the first network has released the RRC connection for a medium duration tune-away, limiting the number of SR attempts to a lower value may conserve power while reducing the time used in either restoring the link or establishing a new link between the UE and the first network.

Figure 7:
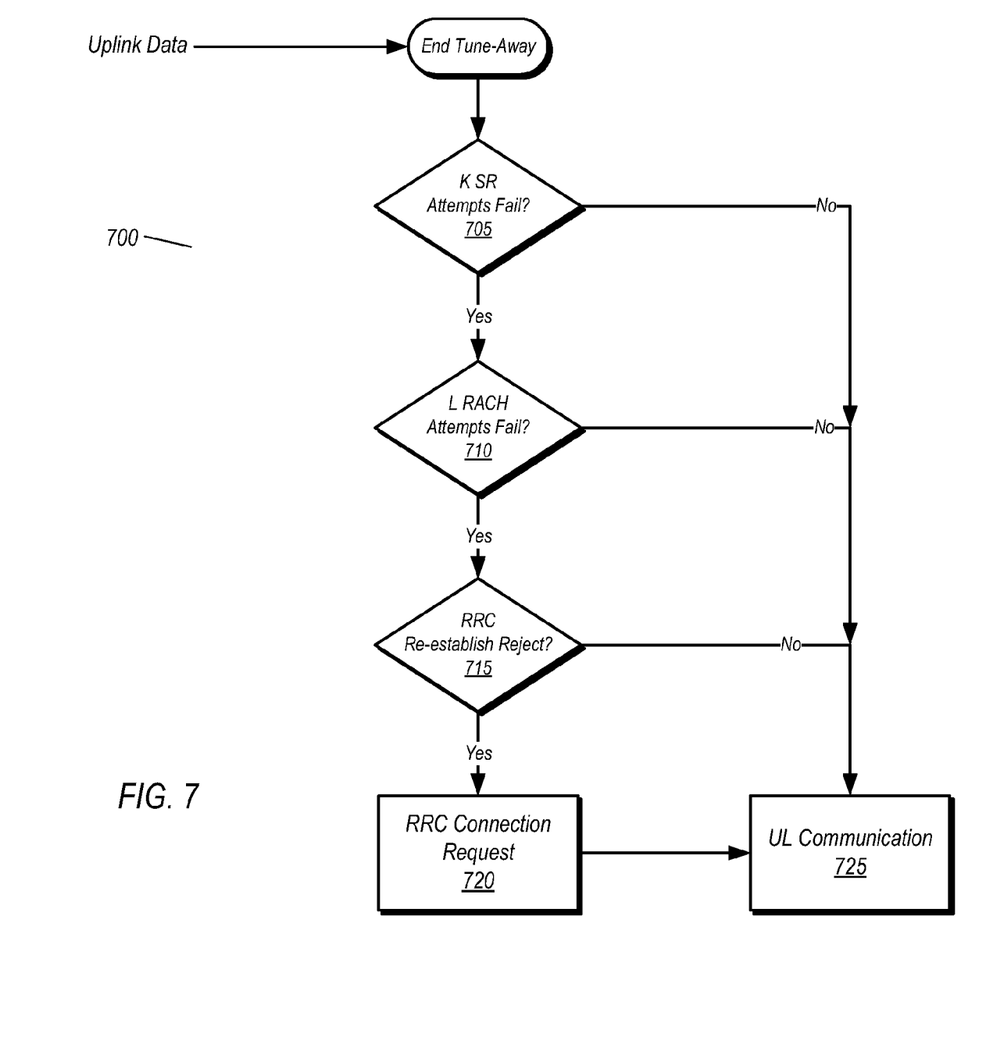
FIG. 7 is a flow diagram illustrating one embodiment of a method for attempting to restore link from a wireless mobile device to a first network after a long duration tune away.

FIG. 7 is a flow diagram illustrating a method for attempting to restore a link from a UE to a first network after a long duration tune away. Method 700 in the embodiment shown may be used when the timer of the UE indicates that the duration of the tune-away exceeds both of the first and second time thresholds. The flow of method 700 is substantially the same as methods 500 and 600 discussed above. However, in this case, the number of RACH attempts is limited to L, wherein L is less than the M attempts allowed in the previous two methods. The number of SR attempts is limited to K in this embodiment of method 700, which is the same value to which it was limited in the embodiment of method 600 discussed above.

Figure 8:
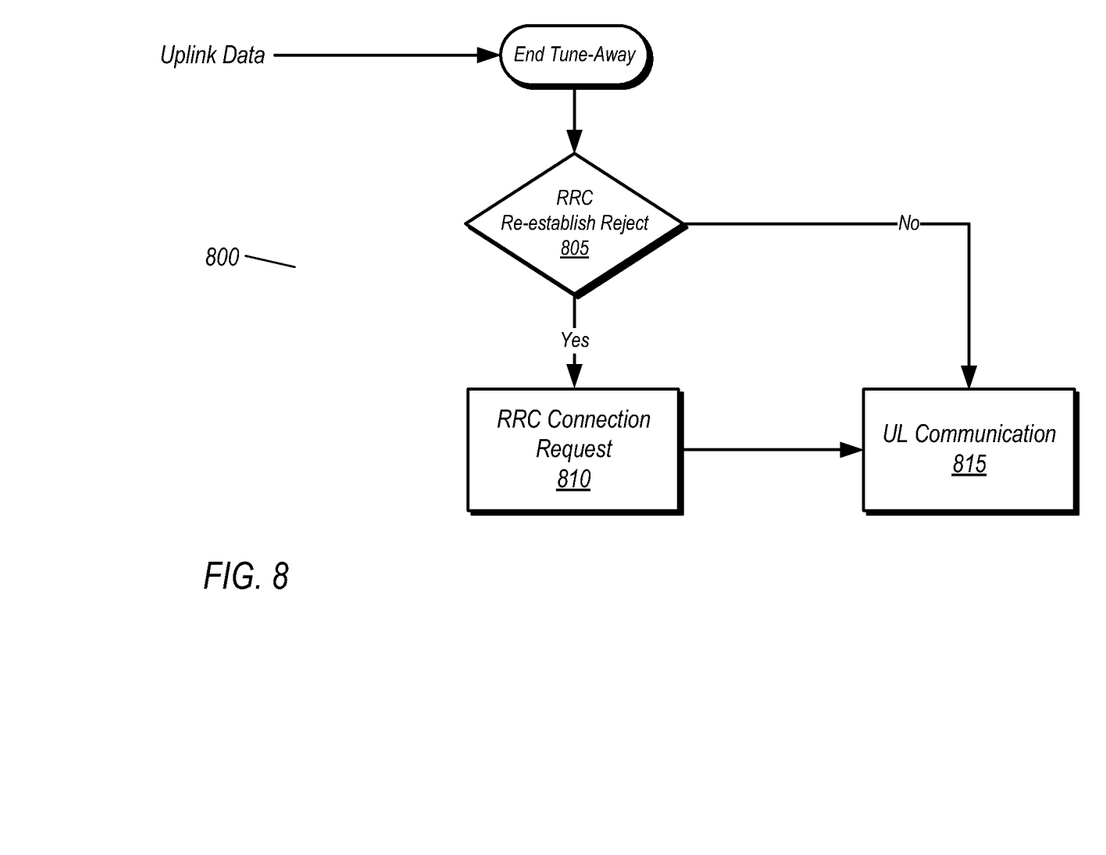
FIG. 8 is a flow diagram illustrating another embodiment of a method for attempting to restore link from a wireless mobile device to a first network after a long duration tune away.

FIG. 8 is a flow diagram illustrating an alternate embodiment of a method for attempting to restore a link between a UE and a first network after a long duration tune away. As with method 700 discussed above, method 800 may be used when the amount of time tuned away from the first network exceeds both first and second time thresholds. In method 800, upon re-tuning to the first network following a long duration tune away, no SR attempts or RACH attempts are made. Instead, method 800 contemplates transmitting a RRC re-establishment request upon re-tuning to the first network with no intervening procedures. If the RRC re-establishment request is rejected (block 805, yes), then an RRC connection request may be sent (block 810) to establish a new link with the first network. Otherwise, if the RRC re-establishment request is not rejected, the link is restored and the UE may transmit communications to the first network via the UL.

Numerous variations and modifications will become apparent to those skilled in the art once the above disclosure is fully appreciated. It is intended that the following claims be interpreted to embrace all such variations and modifications.

What is claimed is:

1. A method for use in a mobile communication device, the method comprising:
    establishing, at the mobile communication device, a wireless link to a Long Term Evolution (LTE) network;
    tuning, at a first time point, a transceiver of the mobile communication device away from the LTE network and to a 3GPP2 Code Division Multiple Access (CDMA) 2000 network;
    re-tuning, at a second time point, the transceiver back to the LTE network;
    determining, using a timer of the mobile communication device, an amount of time elapsed from the first time point to the second time point; and
    calculating, using a control circuit of the mobile communication device, a maximum number of attempts to be performed respectively for each of a plurality of procedures for restoring the wireless link to the LTE network, wherein the maximum number of attempts performed for each of the plurality of procedures is based on the amount time elapsed from the first time point to the second time point, wherein a first one of the plurality of procedures comprises the transceiver transmitting scheduling request (SR) messages, wherein a second one of the plurality of procedures comprises the transceiver transmitting (SR) messages over a random access channel (RACH), and wherein a third one of the plurality of procedures comprises the transceiver transmitting radio resource control (RRC) re-establishment requests wherein the determined maximum numbers of attempts include a first maximum number of attempts, a second maximum number of attempts, and a third maximum number of attempts;

performing, at the mobile communication device, the plurality of procedures according to the determined maximum numbers of attempts, wherein the performing the plurality of procedures includes:

performing up to the first maximum number of attempts to restore the wireless link using the first one of the plurality of procedures;

performing up to the second maximum number of attempts to restore the wireless link using the second one of the plurality of procedures if none of the attempts of the first one of the plurality of procedures is successful in restoring the wireless link;

performing up to the third maximum number of attempts to restore the wireless link using the third one of the plurality of procedures if none of the attempts of the second one of the plurality of procedures is successful in restoring the wireless link.

2. The method as recited in claim 1, wherein for at least one of the plurality of procedures, the maximum number of attempts performed for the at least one of the plurality of procedures is inversely proportional to the amount of time elapsed from the first time point to the second time point.

3. The method as recited in claim 1, wherein said calculating comprises comparing the amount of time elapsed from the first time point to the second time point to one or more time thresholds.

4. The method as recited in claim 1, further comprising incrementally increasing transmission power for successive attempts for at least one of the plurality of procedures.

5. The method as recited in claim 1, wherein
the method further includes:
requesting establishment of a new RRC connection to the LTE network if none of the attempts of the third one of the plurality of procedures is successful in restoring the wireless link.

6. A wireless mobile device comprising:
a transceiver configured to transmit and receive transceiver signals;
a control circuit, wherein the control circuit is configured to tune the transceiver to establish a link with a first network and further configured to cause the transceiver to tune away from the first network to establish a link with a second network and subsequently re-tune to the first network; and
wherein the control circuit is configured to perform one or more procedures to restore the link with the first network subsequent to re-tuning to the first network, wherein a number of attempts that at least one of the one or more procedures is repeated until the link with the first network is restored is calculated by the control circuit based on an amount of time tuned away from the first network, wherein the control circuit is configured to perform up to a first number of attempts of at least one of the one or more procedures to restore the link to the first network if the amount of time tuned away from the first network is less than a first threshold, wherein performing the one or more procedures includes the control circuit causing the transceiver to transmit signals to a base station through which the link to the first network as established, and wherein the control circuit is configured to perform up to a second number of attempts is of at least one of the one or more procedures to restore the link to the first network if the amount of time tuned away from the first network is greater than a first threshold but less than a second threshold, wherein the second number is less than the first number.

7. The wireless mobile device as recited in claim 6, wherein the wireless mobile device is configured to perform up to a third number of attempts of at least one of the one or more procedures to restore the link to the first network if the amount of time tuned away from the first network is greater than the second threshold, wherein the third number is less than the second number.

8. The wireless mobile device as recited in claim 6, wherein the wireless mobile device is configured to discontinue performing one or more attempts of the one or more procedures if any one of the attempts is successful in restoring the link to the first network.

9. A method comprising:
tuning a transceiver of a wireless mobile device away from a first network to a second network subsequent to establishing a link with the first network;
re-tuning the transceiver to the first network subsequent to tuning to the second network;
performing, using the wireless mobile device, up to a first number of attempts of at least a first procedure for restoring the link to the first network subsequent to re-tuning to the first network, wherein the first number is calculated by a control circuit of the wireless mobile device based on an amount of time between turning away from the first network and re-tuning to the first network
performing up to a second number of attempts of a second procedure for restoring the link to the first network if none of the first number of attempts is successful; and
performing up to a third number of attempts is of a third s procedure for restoring the link to the first network if none of the second number of attempts is successful; and
wireless mobile device requesting a new link to the first network if none of the third number of attempts is successful.

10. The method as recited in claim 9, wherein the first procedure includes transmission of a scheduling request over a previously established channel, wherein the second procedure includes transmission of a scheduling request transmitted over a random access channel, and wherein the third procedure includes transmission of a radio resource control re-establishment request.

11. The method as recited in claim 9, further comprising the wireless mobile device tracking an amount of time tuned away from the first network and determining the second number and the third number based on the amount of time tuned away from the first network.

12. A mobile communications device comprising:
a transceiver configured to transmit radio signals to and receive radio signals from each of a first network and a second network;

a control unit configured to, subsequent to establishing a link to the first network, cause the transceiver to tune away from the first network to the second network, and further configured to cause the transceiver to re-tune to the first network, subsequent to tuning to the second network; and a timer configured to determine an amount of time elapsed from when the transceiver was tuned away from the first network to when the transceiver was re-tuned to the first network;

wherein the control unit is configured to determine a maximum number of attempts to be performed of each of a plurality of procedures for restoring a link to the first network upon re-tuning the transceiver to the first network based on the amount of time elapsed;

wherein the control unit is configured to, based on the time elapsed, determine first, second and third maximum numbers of attempts to be performed on first, second and third ones of the plurality of procedures, and further configured to cause the mobile network to perform up to the first maximum number of attempts of the first procedure, perform up to the second maximum number of attempts of the second procedure if none of the attempts of the first procedure is successful in restoring the link to the first network, and perform up to the third maximum number of attempts of the third procedure if none of the attempts of the second procedure is successful in restoring the link to the first network.

13. The mobile communications device as recited in claim 12, wherein the control unit is configured to cause the mobile communications device to request establishment of a new connection to the first network if none of the attempts of the third procedure is successful in restoring the link to the first network.

14. The mobile communications device as recited in claim 12, wherein control unit is configured to:
perform the first procedure by transmitting scheduling requests to the first network over a previously established channel therewith;
perform the second procedure by transmitting scheduling requests over a random access channel;
perform the third procedure by transmitting radio resource control re-establishment requests.

15. A method comprising:
establishing a wireless link between a transceiver and a first network;
tuning the transceiver away from the first network and tuning to a second network and subsequently re-tuning the transceiver to the first network;
performing up to N attempts of a first procedure to restore the link between the transceiver and the first network, wherein a value of N is dependent on an amount of time that the transceiver is tuned to the second network;
performming up to M attempts of a second procedure to restore the link between the transceiver and the first network responsive to a failure to restore the link in the N attempts of the first procedure, wherein a value of M is dependent on an amount of time that the transceiver is tuned to the second network; and
performing up to Z attempts is of a third s procedure to restore the link between the transceiver and the first network responsive to a failure to restore the link in the M attempts of the second procedure, wherein a value of Z is dependent on an amount of time that the transceiver is tuned to the second network.

16. The method as recited in claim 15, further comprising requesting a new link between the transceiver and the first network responsive to a failure to restore the link in the Z attempts of the third procedure.

17. The method as recited in claim 15, further comprising discontinuing performing the first procedure if any one of the N attempts is successful in restoring the link to the first network.

18. A method comprising:
establishing a wireless link between a transceiver of a wireless mobile communication device and a base station of a first network;
tuning the transceiver away from the base station of the first network and tuning to a base station of second network and subsequently re-tuning the transceiver to the base station of the first network; and
performing up to N attempts of a first procedure to restore the link between the transceiver and the base station of first network, wherein a value of N determined by a control circuit of the wireless mobile communication device;
performing up to M attempts of a second procedure to restore the link between the transceiver and the based station of the first network responsive to a failure to restore the link in the N attempts of the first procedure, wherein a value of M is dependent on an amount of time that the transceiver is tuned to the second network; and
performing up to Z attempts of a third procedure to restore the link between the transceiver and the base station of the first network responsive to a failure to restore the link in the M attempts of the second procedure, wherein a value of Z is dependent on an amount of time that the transceiver is tuned to the second network.

19. The method as recited in claim 18, wherein N is a fixed number stored in a storage medium within the control circuit.

20. The method as recited in claim 19, further comprising the control circuit overriding a limit of M attempts of the first procedure as imposed by the base station, wherein M >N.

21. The method as recited in claim 18, wherein N is a variable number, and wherein the method further comprises the control circuit determining N based on an amount of time elapsed between said tuning the transceiver away from the base station of the first network and said re-tuning the transceiver to the base station of the first network.

* * * * *